(12) United States Patent
Baderdinni et al.

(10) Patent No.: US 9,292,228 B2
(45) Date of Patent: Mar. 22, 2016

(54) SELECTIVE RAID PROTECTION FOR CACHE MEMORY

(71) Applicant: LSI Corporation, San Jose, CA (US)

(72) Inventors: Anant Baderdinni, Lawrenceville, GA (US); Horia Simionescu, Foster City, CA (US); Luca Bert, Cumming, GA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 509 days.

(21) Appl. No.: 13/760,990

(22) Filed: Feb. 6, 2013

(65) Prior Publication Data

US 2014/0223094 A1 Aug. 7, 2014

(51) Int. Cl.
*G06F 12/00* (2006.01)
*G06F 3/06* (2006.01)
*G06F 12/12* (2006.01)
*G06F 12/08* (2006.01)
*G06F 11/10* (2006.01)

(52) U.S. Cl.
CPC ............ *G06F 3/0689* (2013.01); *G06F 3/0619* (2013.01); *G06F 3/0647* (2013.01); *G06F 11/1096* (2013.01); *G06F 12/0871* (2013.01); *G06F 12/122* (2013.01); *G06F 12/123* (2013.01); *G06F 2211/1009* (2013.01); *G06F 2212/1032* (2013.01); *G06F 2212/7208* (2013.01)

(58) Field of Classification Search
CPC ... G06F 3/0689; G06F 11/00; G06F 11/1096; G06F 12/0871; G06F 12/122; G06F 2211/1009; G06F 3/0619; G06F 3/0647
See application file for complete search history.

(56) References Cited

U.S. PATENT DOCUMENTS

| | | | |
|---|---|---|---|
| 6,446,220 B1 * | 9/2002 | Menon | 714/5.11 |
| 2002/0091903 A1 | 7/2002 | Mizuno | |
| 2008/0040553 A1 | 2/2008 | Ash et al. | |

* cited by examiner

*Primary Examiner* — Reginald Bragdon
*Assistant Examiner* — Mehdi Namazi (57) ABSTRACT

A RAID controller includes a cache memory in which write cache blocks (WCBs) are protected by a RAID-5 (striping plus parity) scheme while read cache blocks (RCBs) are not protected in such a manner. If a received cache block is an RCB, the RAID controller stores it in the cache memory without storing any corresponding parity information. When a sufficient number of WCBs to constitute a full stripe have been received but not yet stored in the cache memory, the RAID controller computes a corresponding parity block and stores the RCBs and parity block in the cache memory as a single stripe.

18 Claims, 9 Drawing Sheets

| COUNT | COUNT | COUNT | COUNT |
|---|---|---|---|
| VALID?<br>HEAT | VALID?<br>HEAT | VALID?<br>HEAT | VALID?<br>HEAT |
| VALID?<br>HEAT | VALID?<br>HEAT | VALID?<br>HEAT | VALID?<br>HEAT |
| ⋮ | ⋮ | ⋮ | ⋮ |

SELECTIVE RAID PROTECTION FOR CACHE MEMORY

TECHNICAL FIELD OF THE INVENTION

The invention relates generally to data storage systems and, more specifically, to data storage systems employing a RAID scheme.

BACKGROUND OF THE INVENTION

A typical data storage system includes one or more arrays of magnetic disk drives or similar non-volatile storage devices, and a controller that controls the manner and locations in which data is written to and read from the devices. It is important that a host system be able to reliably access all of the data in the data storage system. However, a potential problem that affects data storage systems is that one or more of the devices can fail or malfunction in a manner that prevents the host system from accessing some or all of the data stored on that device.

Figure 1:
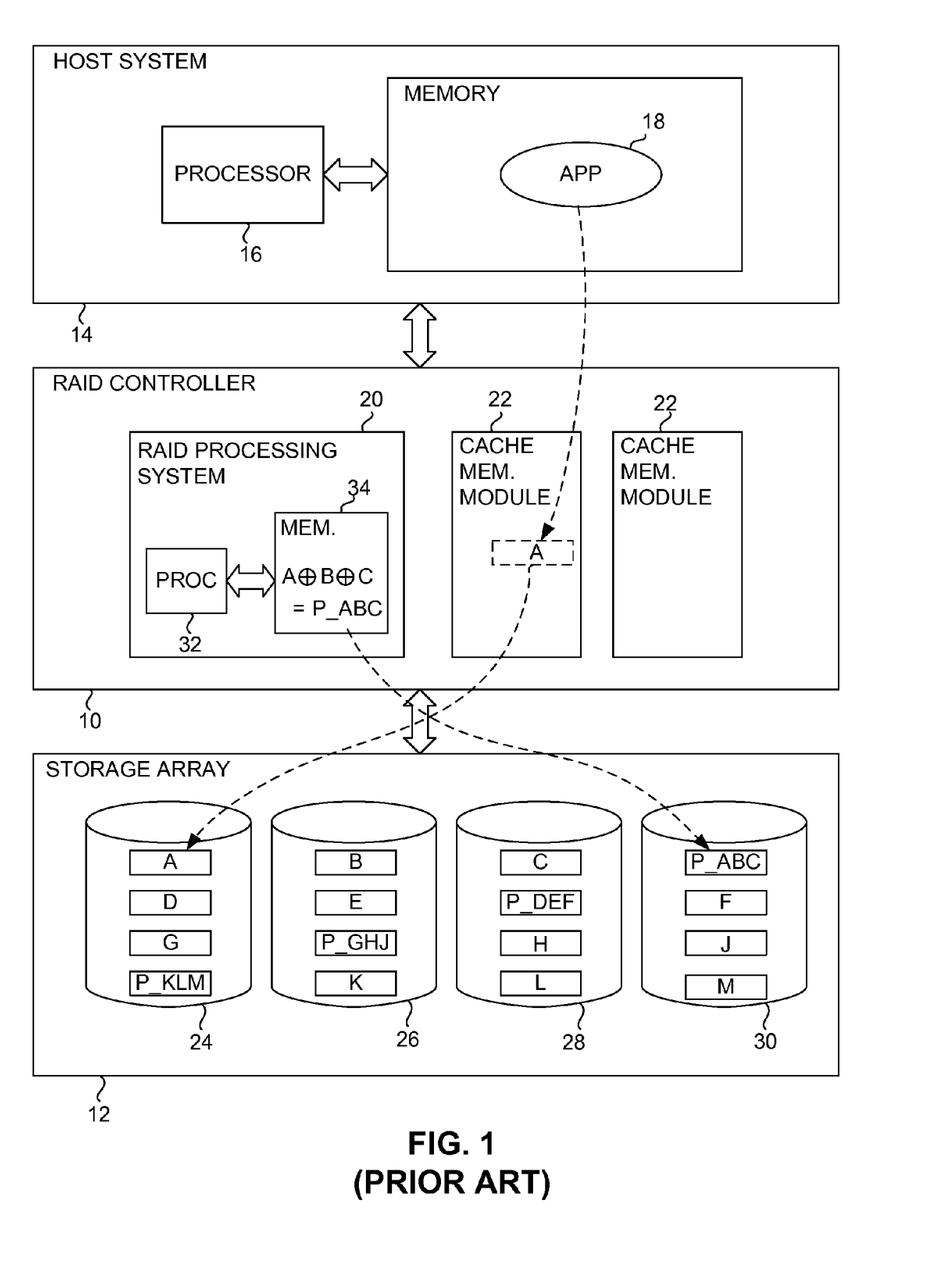
FIG. 1 is a block diagram illustrating a conventional RAID storage system.

A redundant array of inexpensive (or independent) disks (RAID) is a common type of data storage system that addresses the above-referenced reliability problem by enabling recovery from the failure of one or more storage devices. For example, in the system illustrated in FIG. 1, a RAID controller 10 controls a storage array 12 in a manner that enables such recovery. A host (computer) system 14 stores data in and retrieves data from storage array 12 via RAID controller 10. That is, a processor 16, operating in accordance with an application program 18, issues requests for writing data to and reading data from storage array 12. Although for purposes of clarity host system 14 and RAID controller 10 are depicted in FIG. 1 as separate elements, it is common for a RAID controller 10 to be physically embodied as a card that plugs into a motherboard or backplane of such a host system 14.

It is known to incorporate data caching in a RAID system. In the system illustrated in FIG. 1, RAID controller 10 includes a RAID processing system 20 that caches data in units of blocks, which can be referred to as read cache blocks (RCBs) and write cache blocks (WCBs). The WCBs comprise data that host system 14 sends to RAID controller 10 as part of requests to store the data in storage array 12. In response to such a write request from host system 14, RAID controller 10 caches or temporarily stores a WCB in one or more cache memory modules 22, then returns an acknowledgement message to host system 14. At some later point in time, RAID controller 10 transfers the cached WCB (typically along with other previously cached WCBs) to storage array 12. The RCBs comprise data that RAID controller 10 has frequently read from storage array 12 in response to read requests from host system 14. Caching frequently requested data is more efficient than reading it from storage array 12 each time host system 14 requests it, since cache memory modules 22 are of a type of memory, such as flash memory, that can be accessed much faster than the type of memory (e.g., disk drive) that data storage array 12 comprises.

Various RAID schemes are known. The various RAID schemes are commonly referred to by a "level" number, such as "RAID-0," "RAID-1," "RAID-2," etc. As illustrated in FIG. 1, storage array 12 in a conventional RAID-5 system can include, for example, four storage devices 24, 26, 28 and 30 (e.g., arrays of disk drives). In accordance with the RAID-5 scheme, data blocks, which can be either RCBs or WCBs, are distributed across storage devices 24, 26, 28 and 30. Distributing logically sequential data blocks across multiple storage devices is known as striping. Parity information for the data blocks distributed among storage devices 24, 26, 28 and 30 in the form of a stripe is stored along with that data as part of the same stripe. For example, RAID controller 10 can distribute or stripe logically sequential data blocks A, B and C across corresponding storage areas in storage devices 24, 26 and 28, respectively, and then compute parity information for data blocks A, B and C and store the resulting parity information P_ABC in another corresponding storage area in storage device 30.

A processor 32 in RAID processing system 20 is responsible for computing the parity information. Processing system 20 includes some amount of fast local memory 34, such as double data rate synchronous dynamic random access memory (DDR SDRAM) that processor 32 utilizes in the parity computation. To compute the parity in the foregoing example, processor 32 reads data blocks A, B and C from storage devices 24, 26 and 28, respectively, into local memory 34 and then performs an exclusive disjunction operation, commonly referred to as an Exclusive-Or (XOR), on data blocks A, B and C in local memory 34. Processor 32 then stores the computed parity P_ABC in data storage device 30 in the same stripe in which data blocks A, B and C are stored in data storage devices 24, 26 and 28, respectively. The above-described movement of cached data and computed parity information is indicated in a general manner in broken line in FIG. 1.

The RAID-5 scheme employs parity rotation, which means that RAID controller 10 does not store the parity information for each stripe on the same one of data storage devices 24, 26, 28 and 30 as the parity information for all other stripes. For example, as shown in FIG. 1, parity information P_DEF for data blocks D, E and F is stored on storage device 28, while data blocks D, E and F are stored in the same stripe as parity information P_DEF but on storage devices 24, 26 and 30, respectively. Similarly, parity information P_GHJ for data blocks G, H and J is stored on storage device 26, while data blocks G, H and J are stored in the same stripe as parity information P_GHJ but on storage devices 24, 28 and 30, respectively. Likewise, parity information P_KLM for data blocks K, L and M is stored on storage device 24, while data blocks K, L and M are stored in the same stripe as parity information P_KLM but on storage devices 26, 28 and 30, respectively.

SUMMARY

Embodiments of the invention relate to a redundant array of inexpensive disks (RAID) data storage controller and method of its operation. In an exemplary embodiment, the RAID data storage controller includes a cache memory comprising n cache memory modules (where n is an integer greater than two). The RAID data storage controller processes or operates upon read cache blocks (RCBs) it receives from a RAID storage array and write cache blocks (WCBs) it receives from a host system. The RAID data storage controller determines if a received cache block is an RCB associated with a read request issued by the host system for data stored on a RAID storage array or a WCB associated with a write request issued by the host system to store data on the RAID storage array. If the RAID data storage controller determines that the received cache block is an RCB, it stores the received cache block in the cache memory without storing any parity information corresponding to the RCB in the cache memory. The RAID data storage controller also determines if n−1 WCBs have been received but not yet stored in the cache memory. If the RAID data storage controller determines that n−1 WCBs have been received but not yet stored in the cache memory, then the RAID data storage controller computes a parity block responsive to the n−1 WCBs that have been received but not yet stored in the cache memory. The RAID data storage controller stores the n−1 WCBs and the parity block in the cache memory as a single stripe across the n cache memory modules. In addition to the above, the RAID data storage controller controls the transfer of WCBs from the cache memory to the RAID storage array.

DETAILED DESCRIPTION OF AN ILLUSTRATIVE EMBODIMENT

Figure 2:
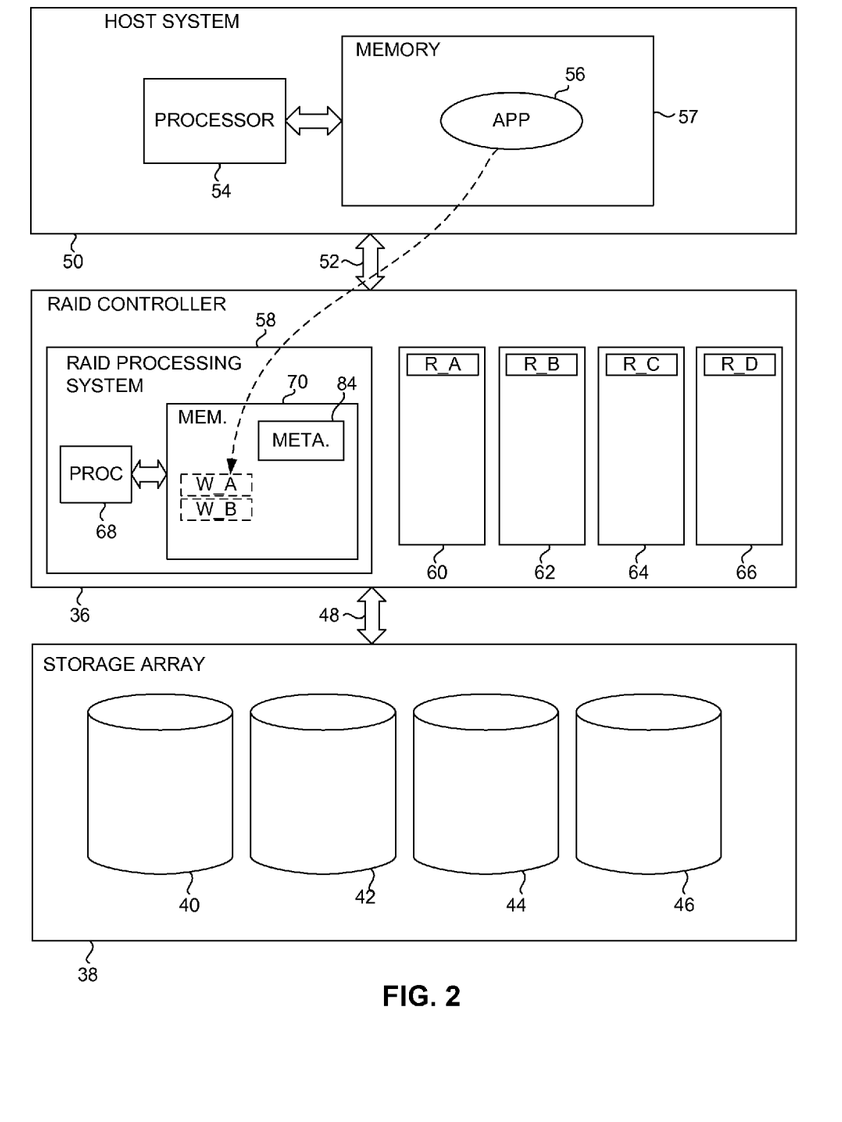
FIG. 2 is a block diagram illustrating a RAID storage system in accordance with an exemplary embodiment of the invention.

As illustrated in FIG. 2, in an illustrative or exemplary embodiment of the invention, a RAID controller 36 controls a storage array 38 having four storage devices 40, 42, 44 and 46, such as disk drive arrays. That the number of storage devices in storage array 38 is four is intended merely as an example, and in other embodiments such a storage array can include any number of storage devices that is suitable for the RAID scheme by which storage array 38 is protected. Although not described in detail herein for purposes of clarity, it should be understood that RAID controller 36, in addition to operating as described below, operates to provide RAID protection, such as, for example, RAID-5 protection, to storage array 38. As well understood in the art, RAID-5 (striping with parity) can be used to protect a storage array having three or more storage devices.

RAID controller 36 communicates with storage array 38 via an interface 48, such as a bus, and also communicates with a host (computer) system 50 via another interface 52, such as another bus. RAID controller 36 can be physically embodied in a card that is pluggable into a motherboard or backplane (not shown) of host system 50 or in any other suitable structure.

Host system 50 stores data in and retrieves data from storage array 38 via RAID controller 36. That is, a processor 54 in host system 50, operating in accordance with an application program 56 or similar software, issues requests for reading and writing data to and from storage array 38. Note that although application program 56 is depicted in a conceptual manner as stored in or residing in a memory 57, persons of skill in the art can appreciate that such software may take the form of multiple modules, segments, programs, files, etc., which are loaded into memory 57 on an as-needed basis in accordance with conventional computing principles. Similarly, although memory 57 is depicted as a single element for purposes of clarity, memory 57 can comprise multiple elements. Likewise, although processor 54 is depicted as a single element for purposes of clarity, processor 54 can comprise multiple elements.

RAID controller 36 includes a RAID processing system 58 that caches data in units of blocks, referred to as read cache blocks (RCBs) and write cache blocks (WCBs). RAID controller 36 also includes cache memory modules 60, 62, 64 and 66, which comprise non-volatile memory such as flash memory. The WCBs comprise data that host system 50 sends to RAID controller 36 as part of requests to store the data in storage array 38. In response to such a write request from host system 50, RAID controller 36 caches or temporarily stores a WCB in cache memory modules 60, 62, 64 and 66 in the manner described below, and then returns an acknowledgement to host system 50. At some later point in time, RAID controller 36 transfers the cached WCB (along with other previously cached WCBs) to storage array 38 in a manner that provides RAID protection to storage array 38. For example, in the exemplary embodiment RAID controller 36 can store the WCBs as well as the RCBs in storage array 38 in accordance with a RAID-5 scheme.

The RCBs comprise data that RAID controller 36 has frequently read from storage array 38 in response to read requests from host system 50. RAID controller 36 can employ conventional or well known caching methods to determine the frequency with which each RCB is requested by host system 50, cache the most frequently requested RCBs in cache memory modules 60, 62, 64 and 66, and respond to read requests by obtaining the requested RCB from cache memory modules 60, 62, 64 and 66 when possible rather than obtaining them from storage array 38. The frequency with which a data block is the subject of a read request or write request (i.e., is accessed) is sometimes referred to as a "heat index." A data block that is more frequently accessed has a higher heat index than a data block that is less frequently accessed. As such conventional caching methods and heat index computations are well understood in the art, they are not described herein in further detail.

As described below, RAID controller 36 protects WCBs stored in cache memory modules 60, 62, 64 and 66 using a form of RAID-5 (striping plus parity) in a selective manner. The term "selective" refers to the use of RAID-5 to protect WCBs but not to protect RCBs. That the number of cache memory modules 60, 62, 64 and 66 in RAID controller 36 of the exemplary embodiment is four is intended merely as an example, because RAID-5 requires at least three storage devices. However, in other embodiments such a RAID controller can include any number (n) of cache memory modules that is greater than two (i.e., three or more cache memory modules). Also, although cache memory modules 60, 62, 64 and 66 are schematically depicted in FIG. 2 as internal to RAID controller 36, it should be understood that some or all of cache memory modules 60, 62, 64 and 66 can be physically separated from other portions of RAID controller 36. For example, some or all of cache memory modules 60, 62, 64 and 66 can be "external" to a pluggable card in which the remainder of RAID controller 36 may be physically embodied and connected to such a card via a cable or other data communication link (not shown).

RAID processing system 58 includes a processor 68 and a local memory 70. Local memory 70 is preferably of a type of memory that is faster than the type of memory that cache memory modules 60, 62, 64 and 66 comprise. For example, local memory 70 can comprise double data rate synchronous random access memory (DDR SDRAM), while cache memory modules 60, 62, 64 and 66 can comprise flash memory. Although local memory 70 is depicted as a single element for purposes of clarity, local memory 70 can comprise multiple elements. Likewise, although processor 68 is depicted as a single element for purposes of clarity, processor 68 can comprise multiple elements. Also, although not shown for purposes of clarity, software or instructions for controlling the operation of processor 68 in whole or part can be loaded into local memory 70. Alternatively, a separate memory from local memory 70, such as a firmware read-only memory (not shown), can be included to provide some or all of the software or instructions for controlling the operation of processor 68.

Figure 3:
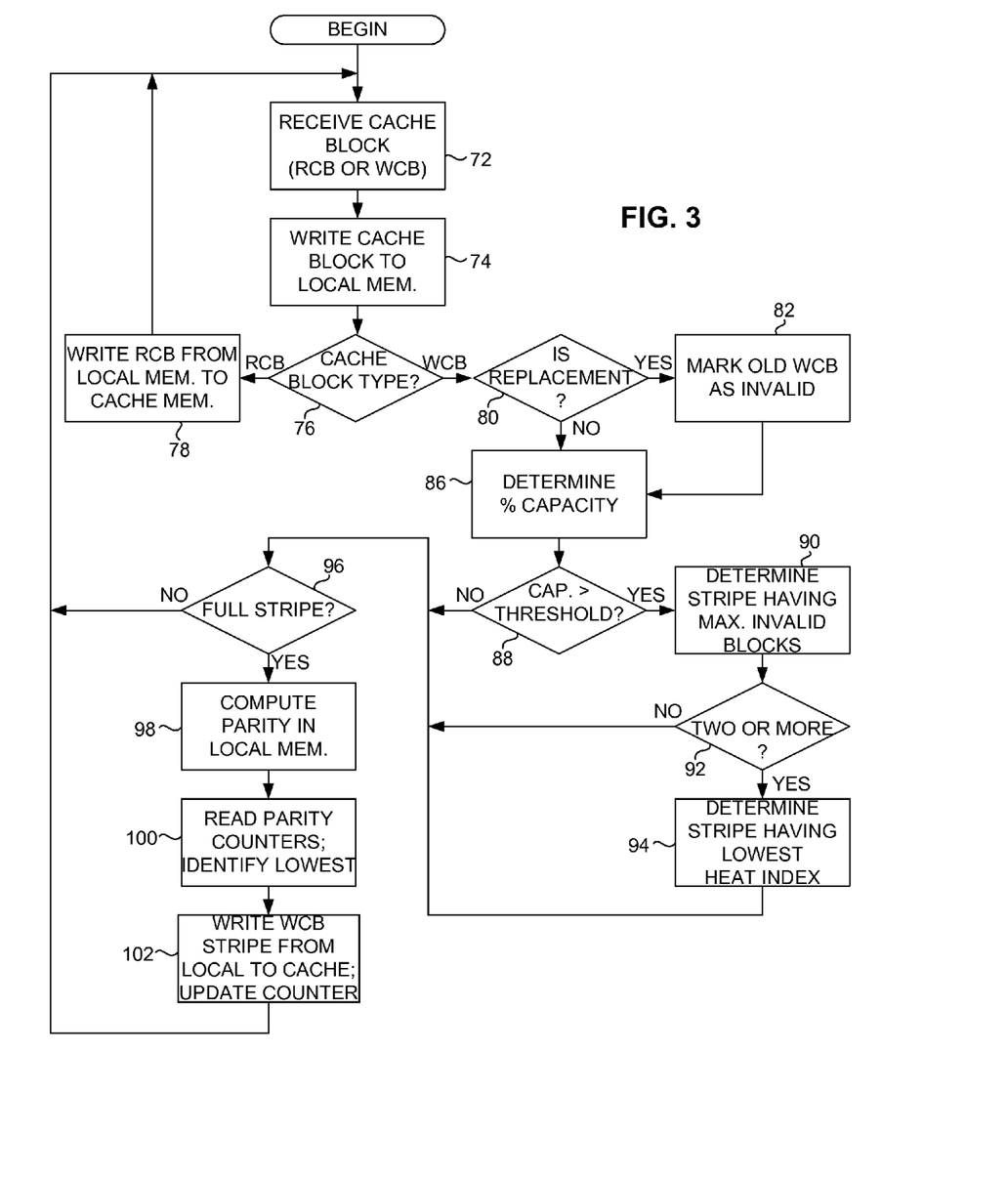
FIG. 3 is a flow diagram illustrating a method of operation of the RAID controller of the RAID storage system of FIG. 2.
Figure 4:
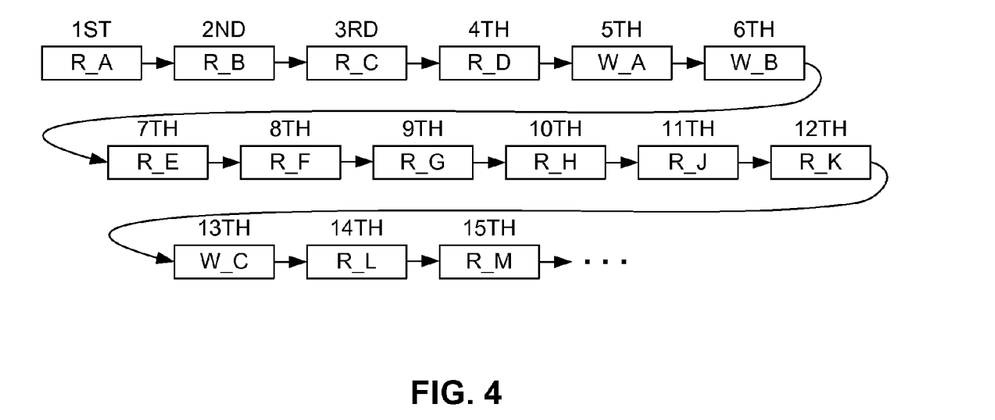
FIG. 4 is a schematic illustration of data blocks received by a RAID controller of the RAID storage system of FIG. 2.

As illustrated in FIG. 3, a method of operation of RAID controller 36 begins with RAID controller 36 receiving a cache block, which may be either a WCB or an RCB, as indicated by block 72. RAID controller 36 initially stores the received WCB or RCB in local memory 70 (FIG. 2), as indicated by block 74. With further reference to FIG. 4, RAID controller 36 may receive what is effectively, from the perspective of RAID controller 36, a stream of RCBs and WCBs. It should be understood that FIG. 4 is not to scale, and no time dimension is intended to be indicated; the time between successive cache blocks arriving at RAID controller 36 may vary. The stream of cache blocks arriving at RAID controller 36 may include a mix of any number of RCBs and WCBs, in any order, as the sequence depends on the read requests and write requests arising from operation of application program 56 as well as the performance of actions by RAID controller 36 to maintain RAID-5 protection of storage array 38. RAID controller 36 receives RCBs via interface 48 (FIG. 2) from storage array 38 and receives WCBs via interface 52 from host system 50. In an exemplary instance shown in FIG. 4, RAID controller 36 may receive a stream of RCBs and WCBs beginning with, for example, a first cache block, which is an RCB R_A. The first cache block is followed by a second cache block, which in this exemplary instance is an RCB R_B. The second cache block is followed by a third cache block, which in this exemplary instance is an RCB R_C. The third cache block is followed by a fourth cache block, which in this exemplary instance is an RCB R_D. The fourth cache block is followed by a fifth cache block, which in this exemplary instance is a WCB W_A. Still further cache blocks follow these, as described below.

Referring again to FIG. 3, as indicated by block 76, RAID controller 36 determines whether the received cache block is an RCB or a WCB. In the exemplary instance shown in FIG. 4, the first cache block is RCB R_A. As indicated by block 78, if RAID controller 36 determines that the received cache block is an RCB, then RAID controller 36 writes or transfers the RCB from local memory 70 to the next available location in cache memory. In FIG. 2, the first available location is the location in cache memory module 60 in which RCB R_A is shown. Note that RAID controller 36 does not write RCB R_A as part of a full-stripe write, in which such a "full" stripe would include writing multiple cache blocks across all of cache memory modules 60, 62, 64 and 66. Rather, RAID controller 36 writes RCB R_A by itself in what may be referred to as a portion of a stripe or a single (block) storage location of a stripe.

RAID controller 36 processes the next three received cache blocks in the exemplary sequence of received cache blocks shown in FIG. 4 in the same manner as described above with regard to the first RCB R_A. That is, in accordance with blocks 72, 74, 76 and 78 in FIG. 3, RAID controller 36 initially stores RCB R_B in local memory 70 and then writes or transfers RCB R_B to the next available location in cache memory. In FIG. 2, the next available location is the location in cache memory module 62 in which RCB R_B is shown. Thus, in this exemplary instance, the first received cache block RCB R_A has been stored in cache memory module 60, and the second received cache block RCB R_B has been stored in cache memory module 62. The process continues until RAID controller 36 has stored the first, second, third and fourth received cache blocks RCB R_A, RCB R_B, RCB R_C and RCB R_D in a stripe spanning cache memory modules 60, 62, 64 and 66, as shown in FIG. 2. In an instance (not shown) in which the next received cache block following such a fourth received cache block is another RCB rather than a WCB, RAID controller 36 would store such an RCB in the next available location in cache memory, such as in cache memory module 60. However, in the exemplary sequence shown in FIG. 4 the fifth received cache block is a WCB W_A. In such an instance, RAID controller 36 processes the received WCB as described below.

Note that RAID controller 36 does not compute or store any parity information corresponding to RCBs R_A, R_B, R_C and R_D. Not storing parity information for an RCB advantageously maximizes memory space utilization among cache memory modules 60, 62, 64 and 66. In the event that a failure of one or more of cache memory modules 60, 62, 64 and 66 results in a loss of one or more RCBs, it is nevertheless possible for RAID controller 36 to restore the lost RCBs by reading them from storage array 38 and writing them to one or more of cache memory modules 60, 62, 64 and 66. However, in the event that a failure of one or more of cache memory modules 60, 62, 64 and 66 results in a loss of one or more WCBs that RAID controller 36 has not yet transferred from cache memory modules 60, 62, 64 and 66 to storage array 38 (sometimes colloquially referred to as "dirty write data"), it generally would not be possible to recover those WCBs absent having corresponding parity information. For this reason, the method is selective about the use of storage space in cache memory modules 60, 62, 64 and 66 for parity information, storing only parity information for WCBs but not storing parity information for RCBs. Not using storage space for RCB parity information increases the total storage space available for both RCBs and WCBs among cache memory modules 60, 62, 64 and 66.

Figure 5:
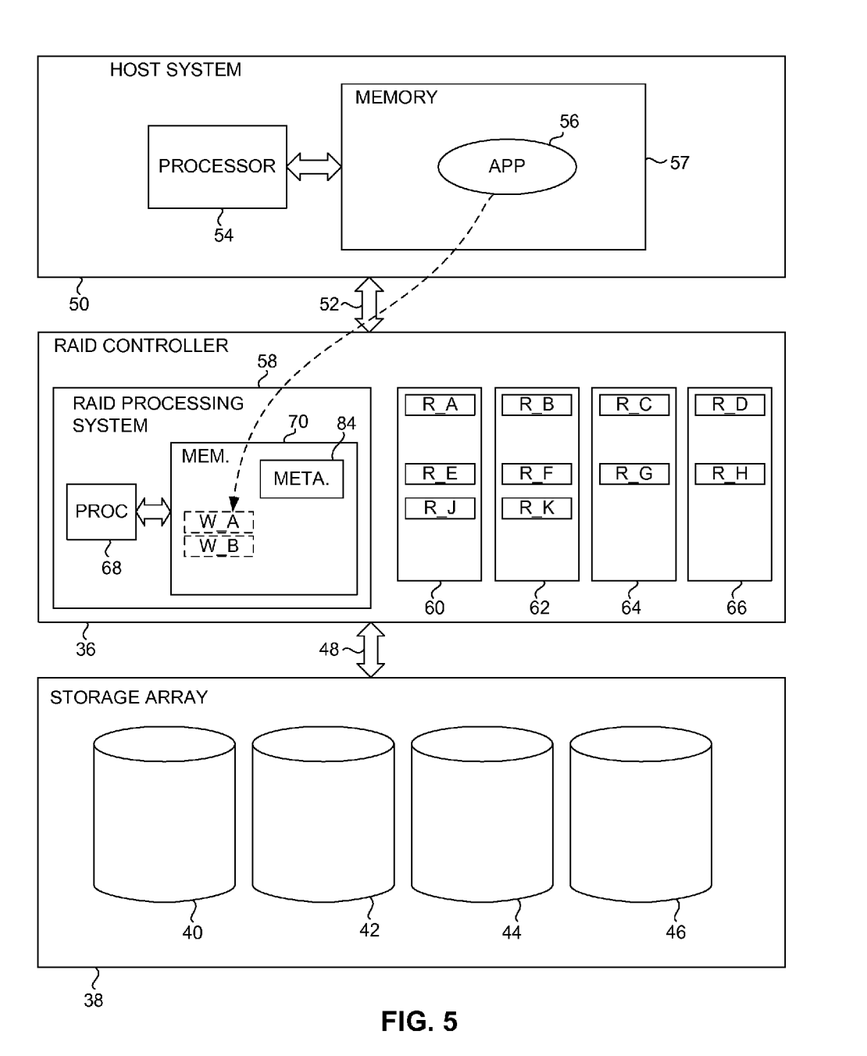
FIG. 5 is similar to FIG. 2, illustrating an aspect of the operation of the RAID storage system.

Referring again to FIG. 3, if RAID controller 36 determines at block 76 that a received cache block is a WCB, RAID controller 36 then proceeds to determine the locations in cache memory modules 60, 62, 64 and 66 in which to store that WCB as well as corresponding parity information. The manner in which RAID processing system 58 of RAID controller 36 does this is described below in further detail. However, preliminary to that description, it can be noted with reference to the exemplary sequence of received cache blocks shown in FIG. 4, in which the fifth and sixth received cache blocks are WCBs W_A and W_B, respectively, RAID processing system 58 initially stores these two received cache blocks in local memory 70, as indicated in broken line in FIG. 2. Note that RAID controller 36 does not at that time write WCB W_A or WCB W_B to cache memory modules 60, 62, 64 or 66 because WCBs are only written to cache memory modules 60, 62, 64 or 66 as part of a full-stripe write operation. In other words, in this exemplary instance RAID processing system 58 only writes WCB W_A and WCB W_B to cache memory modules 60, 62, 64 and 66 once it has received and accumulated in its local memory 70 a sufficient number of WCBs to constitute a full stripe, i.e., three WCBs in the case of the illustrated embodiment. In the meantime, the exemplary sequence shown in FIG. 4 indicates that RAID controller 36 receives a seventh cache block RCB R_E, an eighth cache block RCB R_F, a ninth cache block RCB R_G, a 10th cache block RCB R_H, an 11th cache block RCB R_J, and a 12th cache block RCB R_K. In the same manner described above with regard to RCBs R_A, R_B, R_C and R_D and blocks 72-78 of FIG. 3, RAID processing system 58 processes RCBs R_E, R_F, R_G, R_H, R_J, and R_K. Thus, RCBs R_E, R_F, R_G, R_H, R_J, and R_K are similarly stored in consecutive or otherwise next-available storage locations in cache memory modules 60, 62, 64 and 66, as shown in FIG. 5. Note that although RCBs R_E, R_F, R_G and R_H appear in a stripe, RAID controller 36 writes each individually as it is received and processed (e.g., stored or buffered in local memory 70) rather than writing them together in a full-stripe write operation.

Figure 6:
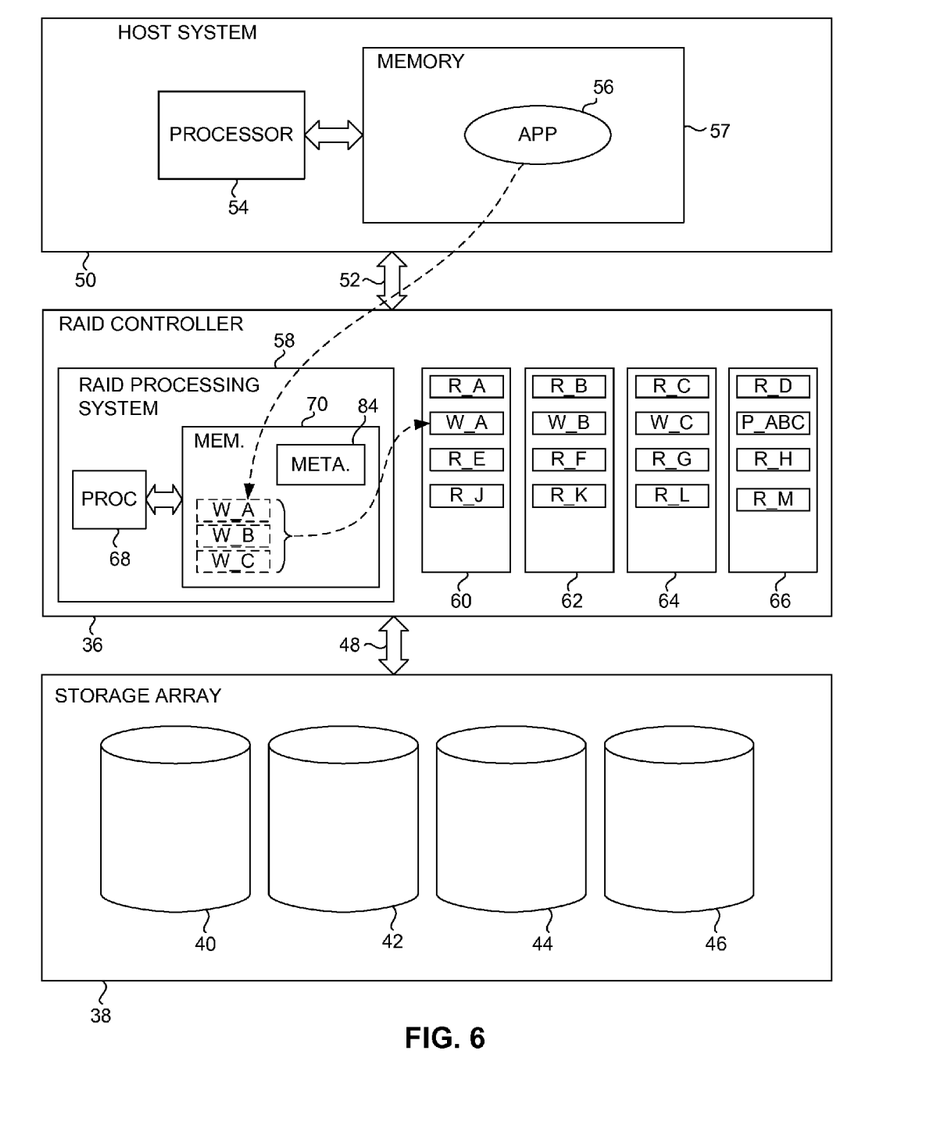
FIG. 6 is similar to FIG. 5, illustrating another aspect of the operation of the RAID storage system.

As illustrated in FIG. 6, it is not until RAID controller 36 has received and initially stored in local memory 70 the 13th cache block in the exemplary sequence of received cache blocks shown in FIG. 4, WCB W_C, that RAID processing system 58 of RAID controller 36 writes or transfers WCBs W_A, W_B and W_C from local memory 70 to cache memory modules 60, 62, 64 and 66 along with a corresponding parity block P_ABC in a full-stripe write operation. Such an operation is described in further detail below with regard to FIG. 3. Note in FIG. 6 that since the next cache blocks that RAID controller 36 receives in the exemplary sequence of FIG. 4 after such a full-stripe write operation are RCBs R_L and R_M, these RCBs are similarly written to the next available storage locations in cache memory modules 60, 62, 64 and 66.

Returning to FIG. 3, if RAID processing system 58 determines at block 76 that the received cache block is a WCB, then RAID RAID processing system 58 determines at block 80 whether the WCB is a replacement block. As well understood in the art, "replacement" data refers to newly received data having the same logical address as data already stored on the storage system. For example, host system 50 may issue a write request to RAID controller 36 to store data having the same logical address as data already stored in storage array 38. Using conventional methods (accordingly not described herein) RAID processing system 58 is capable of determining whether a WCB received from host system 50 is a replacement for a WCB already stored in cache memory modules 60, 62, 64 and 66. If RAID processing system 58 determines at block 80 that a received WCB is a replacement block, then RAID processing system 58 marks the corresponding old or already-stored WCB as "invalid," as indicated by block 82. RAID processing system 58 can do this by storing an "invalid" indication in a metadata table 84 (FIG. 7) or similar data structure in local memory 70 or a similar memory.

Figure 7:
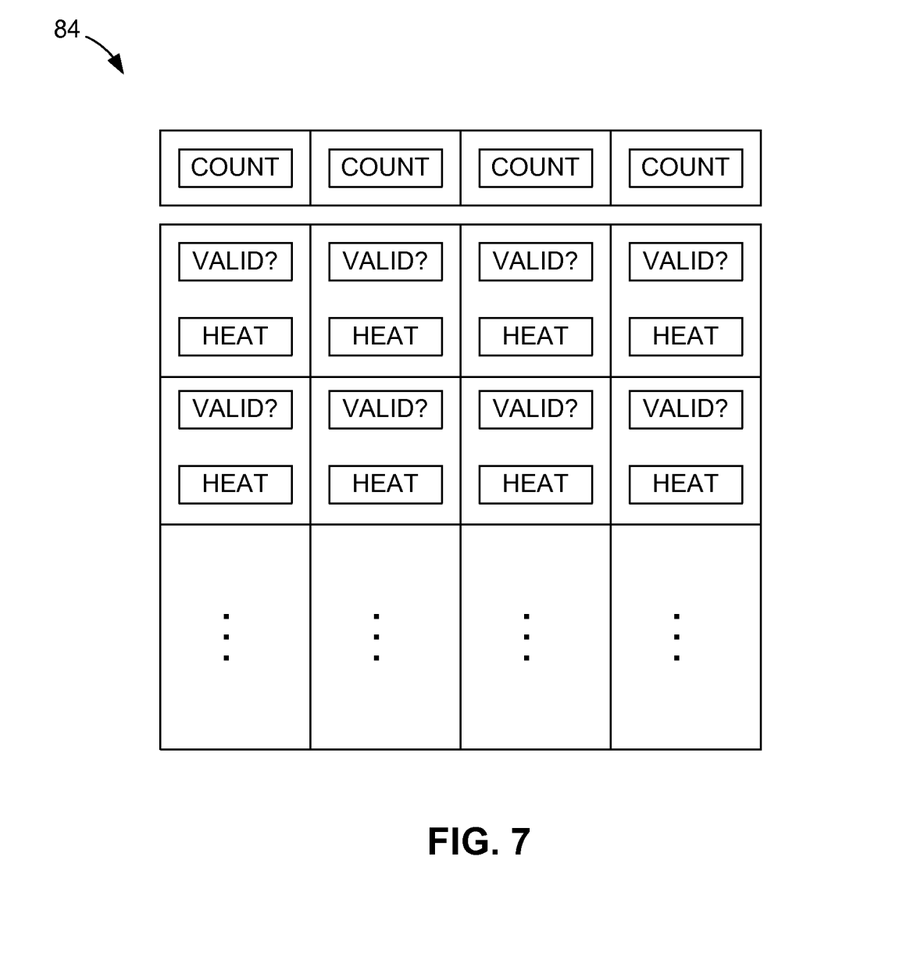
FIG. 7 is a schematic illustration of a metadata table or similar data structure stored in a local memory of the RAID controller of the RAID storage system of FIGS. 2, 5 and 6.
Figure 8:
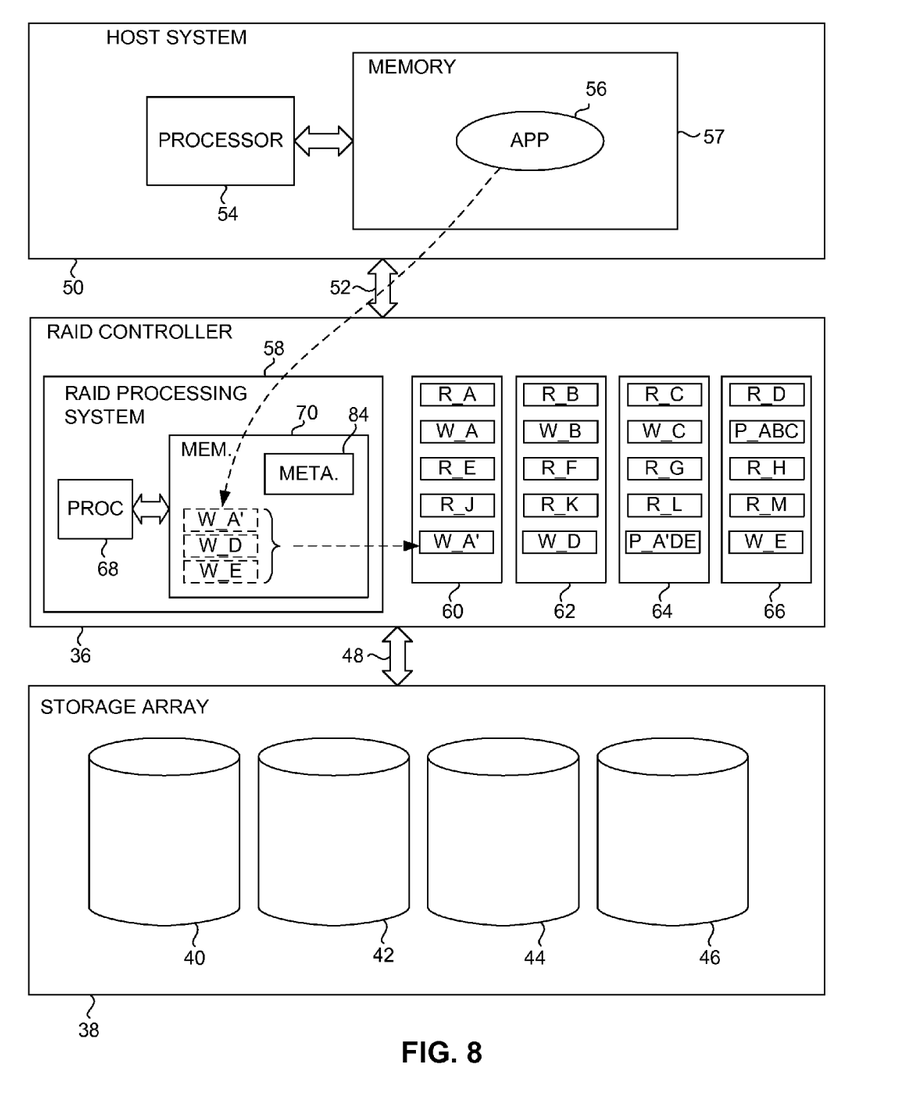
FIG. 8 is similar to FIGS. 5 and 6, illustrating still another aspect of the operation of the RAID storage system.

As illustrated in FIG. 7, metadata table 84 can have a structure generally corresponding to the structure of cache memory modules 60, 62, 64 and 66, with columns in metadata table 84 corresponding to cache memory modules 60, 62, 64 and 66, and rows in metadata table 84 corresponding to stripes spanning cache memory modules 60, 62, 64 and 66. Each location in metadata table 84 can include a validity indicator ("VALID?"), which can have a state of either "valid" or "invalid." Each location in metadata table 84 can also include a heat index indicator ("HEAT"), which can assume a value corresponding to the heat index of the cache block stored in the corresponding location in cache memory modules 60, 62, 64 and 66. RAID processing system 58 stores a replacement WCB in local memory 70 in the same manner as any other received cache block and defers transferring the replacement WCB from local memory 70 to cache memory modules 60, 62, 64 and 66 until a sufficient number of WCBs to constitute a full stripe, i.e., three WCBs in the case of this exemplary embodiment, have been accumulated in local memory 70. An exemplary three such WCBs are shown in broken line in FIG. 8 stored in local memory 70, where W_A' is a replacement for W_A, and WCB_D and WCB_E are other WCBs that have been received. In the manner described above, once these WCBs have been received and stored in local memory 70, RAID processing system 58 writes or transfers WCBs W_A', W_D and W_E from local memory 70 to cache memory modules 60, 62, 64 and 66 along with a corresponding parity block (P_A'DE) in a full-stripe write operation. Note in FIG. 8 that in this exemplary instance RAID processing system 58 writes the WCB stripe in the next available locations in cache memory modules 60, 62, 64 and 66. However, in other instances, described below, RAID processing system 58 may write a WCB stripe in a manner that overwrites or replaces a stripe in cache memory modules 60, 62, 64 and 66.

Another function of RAID controller 36 is to determine when to overwrite or replace a stripe in cache memory modules 60, 62, 64 and 66. In a conventional RAID-5 system such as that shown in FIG. 1, a determination whether to overwrite or replace a stripe may be made when the RAID controller 10 determines that the storage array 12 has reached a threshold percentage of its total storage capacity. For example, the threshold may be 70 percent of total storage capacity. As indicated by block 86 in FIG. 3, RAID processing system 58 of RAID controller 36 determines the percentage of storage capacity that storage array 38 has reached. As indicated by block 88, RAID processing system 58 then determines whether this percentage exceeds a threshold, such as, for example, 70 percent. If RAID processing system 58 determines that the percentage exceeds the threshold, then RAID processing system 58 determines which stripe to overwrite or replace.

In the exemplary embodiment, RAID processing system 58 takes two factors into account in determining which stripe to overwrite or replace: the number of invalid cache blocks and the heat index. As indicated by block 90, RAID processing system 58 reads metadata table 84 (FIG. 7) to determine which stripe in cache memory modules 60, 62, 64 and 66 has the greatest number (i.e., a maximum) of invalid blocks. As indicated by block 92, if RAID processing system 58 determines that one such stripe has more invalid blocks than all other such stripes, then RAID processing system 58 will overwrite that stripe with the next WCB stripe that is ready to be written. However, if RAID processing system 58 determines that two or more such stripes have an equally great number of invalid blocks such that there is no single stripe having a maximum greater than the others, then RAID processing system 58 further takes the heat index into account. As indicated by block 94, RAID processing system 58 determines which stripe in cache memory modules 60, 62, 64 and 66 has the highest (i.e., a maximum) heat index. RAID processing system 58 can do this by reading the heat indices from metadata table 84 and summing the heat indices of the cache blocks of each stripe to form a total heat index for that stripe. In such an instance RAID processing system 58 will overwrite the stripe having the highest total heat index with the next WCB stripe that is ready to be written.

Once RAID processing system 58 has determined which stripe to overwrite or replace or, if block 88 indicates that storage array 38 has not reached the threshold capacity, RAID processing system 58 is ready to write the next WCB stripe.

As indicated by block 96, RAID processing system 58 determines if a sufficient number of WCBs have been accumulated in local memory 70 to constitute a full stripe. If RAID processing system 58 determines that a sufficient number of WCBs are not stored in local memory 70, then RAID processing system 58 awaits receipt of the next cache block, as described above with regard to block 72. However, if RAID processing system 58 determines that a sufficient number of WCBs are stored in local memory 70, then RAID processing system 58 computes a parity block corresponding to those WCBs, as indicated by block 98. With reference to the exemplary instance described above with regard to FIG. 6, RAID processing system 58 can compute the parity block P_ABC by performing the computation: W_A XOR W_B XOR W_C. Similarly with regard to the exemplary instance described above with regard to FIG. 8, RAID processing system 58 can compute the parity block P_A'DE by performing the computation: W_A' XOR W_D XOR W_E. RAID processing system 58 can efficiently compute and store the parity block because a single XOR operation can be performed in parallel on multiple WCBs in local memory 70. That is, it is not necessary for RAID processing system 58 to retrieve each of, for example, W_A, W_B and W_C by performing three separate read operations, then perform two separate XOR operations, and then perform four separate write operations to store W_A, W_B, W_C and P_ABC in cache memory modules 60, 62, 64 and 66. Rather, RAID processing system 58 can perform a single XOR operation on the three WCBs in local memory 70 and then perform only four write operations (i.e., a full-stripe write operation) to store W_A, W_B, W_C and P_ABC in cache memory modules 60, 62, 64 and 66. Alternatively, RAID processing system 58 can transfer a subset of the WCBs to cache memory before computing and storing the corresponding parity block, as there is no need for RAID processing system 58 to wait.

Another function of RAID controller 36 is to control what is sometimes referred to in the RAID-5 context as parity rotation. With regard to the exemplary embodiment, parity rotation refers to the staggering or spreading of parity blocks among cache memory modules 60, 62, 64 and 66. That is, before writing a stripe across cache memory modules 60, 62, 64 and 66, RAID processing system 58 of RAID controller 36 determines to which of cache memory modules 60, 62, 64 and 66 it is to write the computed parity block. Referring briefly again to FIG. 7, metadata table 84 can further include a number of counters ("COUNT"), each corresponding to one of cache memory modules 60, 62, 64 and 66 and maintaining a value equal to the total number of parity blocks stored in that corresponding one of cache memory modules 60, 62, 64 and 66. Returning to FIG. 3, as indicated by block 100, RAID processing system 58 reads these counters and determines which counter has the lowest count. As indicated by block 102, in writing the WCBs from local memory 70 to cache memory modules 60, 62, 64 and 66, RAID processing system 58 writes the parity block to the one of cache memory modules 60, 62, 64 and 66 corresponding to the counter having the lowest count and writes the WCBs from which the parity block was computed to the remaining ones of cache memory modules 60, 62, 64 and 66 in the full-stripe manner described above. If two or more counters have an equally low count that is lower than the counts of the other counters, then RAID processing system 58 can randomly select one of them.

Figure 9:
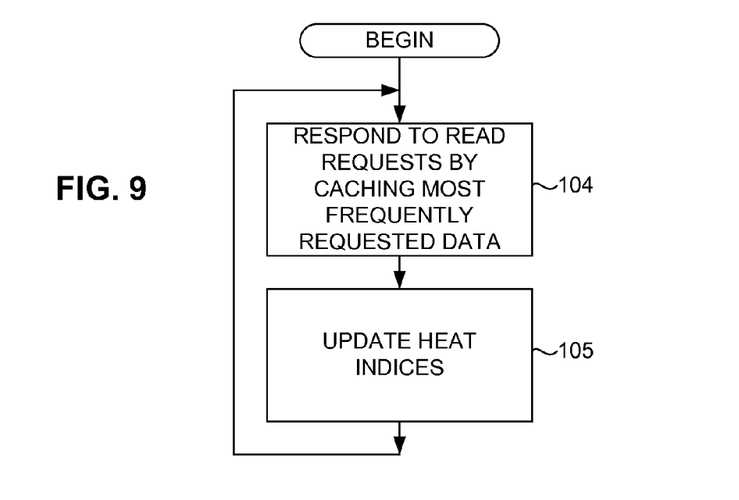
FIG. 9 is a flow diagram illustrating an aspect of the method of operation of the RAID storage system relating to read data caching.

As illustrated in FIG. 9 by block 104, it should be understood that RAID controller 36 responds to read requests received from host system 50 not only in the manner described above with regard to FIG. 3 but also by ensuring that the most frequently requested RCB data is stored in cache memory modules 60, 62, 64 and 66. RAID processing system 58 of RAID controller 36 can do this using any suitable conventional methods. RAID processing system 58 also computes or updates the heat indices of the RCBs stored in cache memory modules 60, 62, 64 and 66, as indicated by block 105. RAID processing system 58 can do this using any suitable conventional methods. As such methods are well understood in the art, they are not described herein in further detail.

Figure 10:
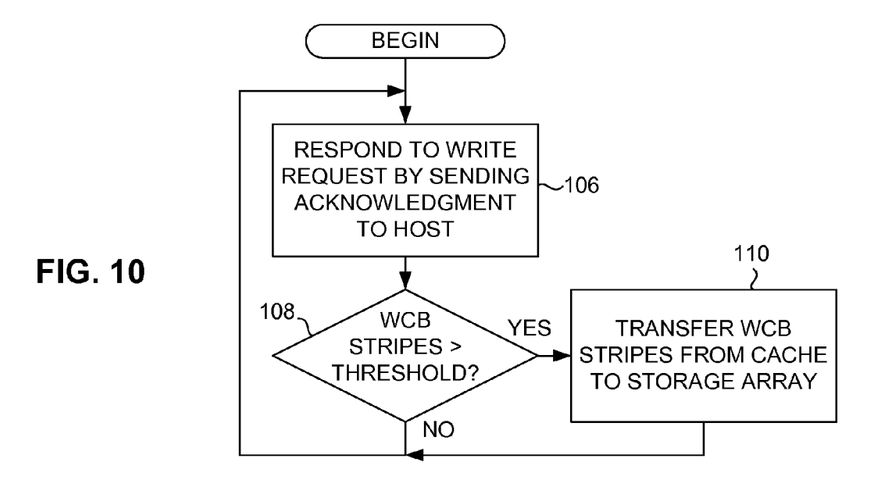
FIG. 10 is a flow diagram illustrating an aspect of the method of operation of the RAID storage system relating to write data caching.

As illustrated in FIG. 10, it should be understood that RAID controller 36 responds to write requests received from host system 50 not only in the manner described above with regard to FIG. 3 but also by sending an acknowledgement to host system 50 once the WCB or WCBs identified in the write request have been stored in cache memory modules 60, 62, 64 and 66, as indicated by block 106. Also, as indicated by blocks 108 and 110, once RAID processing system 58 determines that a threshold number of WCB stripes have been stored in cache memory modules 60, 62, 64 and 66, RAID processing system 58 transfers one or more WCB stripes from cache memory modules 60, 62, 64 and 66 to storage array 38. The threshold can be any suitable percentage of the total number of stripes that cache memory modules 60, 62, 64 and 66 are capable of storing. In transferring a WCB stripe, RAID processing system 58 maintains a RAID-5 scheme across storage devices 40, 42, 44 and 46. Thus, RAID processing system 58 uses a RAID-5 scheme to protect not only the data stored in storage array 38 but also a selected portion of the data stored in cache memory modules 60, 62, 64 and 66; namely, the portion comprising WCBs.

It should be understood that the flow diagrams of FIGS. 3, 9 and 10 are intended only to be exemplary or illustrative of the logic underlying the described method. Persons skilled in the art can appreciate that in various embodiments RAID processing system 58 of RAID controller 36 can be programmed or configured in any of various ways to effect the described methods. The steps or acts described above with regard to FIG. 3 can occur in any suitable order or sequence, including in parallel or asynchronously with each other. Steps or acts described above with regard to FIG. 3 can be combined with others or omitted in some embodiments. Although depicted for purposes of clarity in the form of three separate flow diagrams in FIGS. 3, 9 and 10, the underlying logic can be modularized or otherwise arranged in any suitable manner. Persons skilled in the art will readily be capable of programming or configuring RAID processing system 58 with suitable software or in suitable logic, such as in the form of an application-specific integrated circuit (ASIC) or similar device or combination of devices, to effect the above-described methods. Also, it should be understood that the combination of software instructions or similar logic and the local memory 70 or other memory in which such software instructions or similar logic is stored or embodied for execution by processor 68, comprises a "computer-readable medium" or "computer program product" as that term is used in the patent lexicon.

It should be noted that the invention has been described with reference to one or more exemplary embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for operating a redundant array of inexpensive disks (RAID) data storage controller having a cache memory, the cache memory comprising n cache memory modules, where n is an integer greater than two, the method comprising:
- receiving a received cache block;
- determining if the received cache block is a read cache block associated with a read request issued by the host system for data stored on a RAID storage array or a write cache block associated with a write request issued by the host system to store data on the RAID storage array;
- storing the received cache block in the cache memory without storing any parity information corresponding to the read cache block in the cache memory in response to a determination that the received cache block is the read cache block;
- determining if n−1 write cache blocks have been received but not yet stored in the cache memory;
- computing a parity block responsive to the n−1 write cache blocks that have been received but not yet stored in the cache memory in response to a determination that n−1 write cache blocks have been received but not yet stored in the cache memory;
- storing the n−1 write cache blocks and the parity block in the cache memory as a single stripe across the n cache memory modules; and
- transferring one or more write cache blocks from the cache memory to the RAID storage array.

2. The method of claim 1, further comprising:
- storing each received cache block determined to be a write cache block in a local memory other than the cache block memory before storing the write cache block in the cache memory;
- wherein determining if n−1 write cache blocks have been received but not yet stored in the cache memory comprises determining if n−1 write cache blocks have been received and stored in the local memory.

3. The method of claim 2, wherein:
- computing the parity block responsive to the n−1 write cache blocks that have been received but not yet stored in the cache memory comprises performing an Exclusive-Or (XOR) operation on the n−1 write cache blocks stored in the local memory;
- storing the n−1 write cache blocks and the parity block in the cache memory as a single stripe across the n cache memory modules comprises transferring the n−1 write cache blocks and the parity block from the local memory to the cache memory.

4. The method of claim 1, wherein storing the n−1 write cache blocks and the parity block in the cache memory as a single stripe across the n cache memory modules comprises:
- identifying a cache memory module of the n cache memory modules having a minimum number of parity blocks; and
- storing the parity block in the cache memory module identified as having the minimum number of parity blocks.

5. The method of claim 1, further comprising:
- determining if the received cache block is a replacement for a write cache block stored in the cache memory;
- storing a marker identifying the write cache block stored in the cache memory as invalid in response to a determination that the received cache block is a replacement for the write cache block stored in the cache memory; and
- wherein storing the n−1 write cache blocks and the parity block in the cache memory as a single stripe across the n cache memory modules comprises: identifying a stripe corresponding to a maximum number of stored markers identifying write cache blocks stored in the cache memory in the stripe as invalid; and replacing the stripe identified as corresponding to the maximum number of stored markers with the n−1 write cache blocks and the parity block in the cache memory.

6. The method of claim 5, further comprising:
- computing a total heat index for each stripe stored in the cache memory; and
- determining if two or more stripes are identified as corresponding to the maximum number of stored markers;
- wherein storing the n−1 write cache blocks and the parity block in the cache memory as the single stripe across the n cache memory modules comprises: identifying the stripe having the lowest total heat index; and replacing the stripe identified as having the lowest total heat index with the n−1 write cache blocks and the parity block in the cache memory in response to the determination that two or more stripes are identified as corresponding to the maximum number of stored markers.

7. A redundant array of inexpensive disks (RAID) data storage controller system, comprising:
- a first interface for communicating data with a host system;
- a second interface for communicating data with a RAID storage array;
- a cache memory comprising n cache memory modules, where n is an integer greater than two; and
- a processing system configured to:
- receive a received cache block;
- determine if the received cache block is a read cache block associated with a read request issued by the host system for data stored on a RAID storage array or a write cache block associated with a write request issued by the host system to store data on the RAID storage array;
- store the received cache block in the cache memory without storing any parity information corresponding to the read cache block in the cache memory in response to a determination that the received cache block is the read cache block;
- determine if n−1 write cache blocks have been received but not yet stored in the cache memory;
- compute a parity block responsive to the n−1 write cache blocks that have been received but not yet stored in the cache memory in response to a determination that n−1 write cache blocks have been received but not yet stored in the cache memory;
- store the n−1 write cache blocks and the parity block in the cache memory as a single stripe across the n cache memory modules; and
- transfer one or more write cache blocks from the cache memory to the RAID storage array.

8. The system of claim 7, wherein the processing system is further configured to:
- store each received cache block determined to be a write cache block in a local memory other than the cache block memory before storing the write cache block in the cache memory;
- wherein the processing system is configured to determine if n−1 write cache blocks have been received but not yet stored in the cache memory by being configured to determine if n−1 write cache blocks have been received and stored in the local memory.

9. The system of claim 8, wherein:
- the processing system is configured to compute the parity block responsive to the n−1 write cache blocks that have been received but not yet stored in the cache memory by being configured to perform an Exclusive-Or (XOR) operation on the n−1 write cache blocks stored in the local memory;

the processing system is configured to store the n−1 write cache blocks and the parity block in the cache memory as a single stripe across the n cache memory modules by being configured to transfer the n−1 write cache blocks and the parity block from the local memory to the cache memory.

10. The system of claim 7, wherein the processing system is configured to store the n−1 write cache blocks and the parity block in the cache memory as a single stripe across the n cache memory modules by being configured to:
identify the cache memory module of the n cache memory modules having the minimum number of parity blocks; and
store the parity block in a cache memory module identified as having a minimum number of parity blocks.

11. The system of claim 7, wherein the processing system is further configured to:
determine if the received cache block is a replacement for a write cache block stored in the cache memory;
store a marker identifying the write cache block stored in the cache memory as invalid in response to a determination that the received cache block is a replacement for the write cache block stored in the cache memory; and
wherein the processing system is configured to store the n−1 write cache blocks and the parity block in the cache memory as a single stripe across the n cache memory modules by being configured to: identify a stripe corresponding to a maximum number of stored markers identifying write cache blocks stored in the cache memory in the stripe as invalid; and replace the stripe identified as corresponding to the maximum number of stored markers with the n−1 write cache blocks and the parity block in the cache memory.

12. The system of claim 11, wherein the processing system is further configured to:
compute a total heat index for each stripe stored in the cache memory; and
determine if two or more stripes are identified as corresponding to the maximum number of stored markers;
wherein the processing system is configured to store the n−1 write cache blocks and the parity block in the cache memory as the single stripe across the n cache memory modules by being configured to: identify a stripe having a lowest total heat index; and replace the stripe identified as having the lowest total heat index with the n−1 write cache blocks and the parity block in the cache memory in response to the determination that two or more stripes are identified as corresponding to the maximum number of stored markers.

13. A computer readable medium having stored thereon in computer executable non-transitory form instructions that, when executed on a processing system of a redundant array of inexpensive disks (RAID) data storage controller system, cause the processing system to:
receive a received cache block;
determine if the received cache block is a read cache block associated with a read request issued by a host system for data stored on a RAID storage array or a write cache block associated with a write request issued by the host system to store data on the RAID storage array;
store the received cache block in the cache memory without storing any parity information corresponding to the read cache block in the cache memory in response to a determination that the received cache block is the read cache block;
determine if n−1 write cache blocks have been received but not yet stored in the cache memory;
compute a parity block responsive to the n−1 write cache blocks that have been received but not yet stored in the cache memory in response to a determination that n−1 write cache blocks have been received but not yet stored in the cache memory;
store the n−1 write cache blocks and the parity block in the cache memory as a single stripe across the n cache memory modules; and
transfer one or more write cache blocks from the cache memory to the RAID storage array.

14. The computer readable medium of claim 13, further comprising instructions that, when executed on the processing system of a RAID data storage controller system, cause the processing system to:
store each received cache block determined to be a write cache block in a local memory other than the cache block memory before storing the write cache block in the cache memory;
wherein the processing system is configured to determine if n−1 write cache blocks have been received but not yet stored in the cache memory by being configured to determine if n−1 write cache blocks have been received and stored in the local memory.

15. The computer readable medium of claim 14, wherein:
the instructions that cause the processing system to compute the parity block responsive to the n−1 write cache blocks that have been received but not yet stored in the cache comprise instructions that cause the processing system to perform an Exclusive-Or (XOR) operation on the n−1 write cache blocks stored in the local memory; and
the instructions that cause the processing system to store the n−1 write cache blocks and the parity block in the cache memory as a single stripe across the n cache memory modules comprise instructions that cause the processing system to transfer the n−1 write cache blocks and the parity block from the local memory to the cache memory.

16. The computer readable medium of claim 13, wherein the instructions that cause the processing system to store the n−1 write cache blocks and the parity block in the cache memory as a single stripe across the n cache memory modules comprise instructions that cause the processing system to:
identify a cache memory module of the n cache memory modules having a minimum number of parity blocks; and
store the parity block in the cache memory module identified as having the minimum number of parity blocks.

17. The computer readable medium of claim 13, further comprising instructions that, when executed on the processing system of a RAID data storage controller system, cause the processing system to:
determine if the received cache block is a replacement for a write cache block stored in the cache memory;
store a marker identifying the write cache block stored in the cache memory as invalid in response to a determination that the received cache block is a replacement for the write cache block stored in the cache memory; and
wherein the instructions that cause the processing system to store the n−1 write cache blocks and the parity block in the cache memory as a single stripe across the n cache memory modules comprise instructions that cause the processing system to: identify a stripe corresponding to a maximum number of stored markers identifying write cache blocks stored in the cache memory in the stripe as invalid; and replace the stripe identified as corresponding to the maximum number of stored markers with the n−1 write cache blocks and the parity block in the cache memory.

18. The computer readable medium of claim 17, further comprising instructions that, when executed on the processing system of a RAID data storage controller system, cause the processing system to:
compute a total heat index for each stripe stored in the cache memory; and
determine if two or more stripes are identified as corresponding to the maximum number of stored markers;
wherein the instructions that cause the processing system to store the n−1 write cache blocks and the parity block in the cache memory as the single stripe across the n cache memory modules comprise instructions that cause the processing system to: identify a stripe having a lowest total heat index; and replace the stripe identified as having the lowest total heat index with the n−1 write cache blocks and the parity block in the cache memory in response to the determination that two or more stripes are identified as corresponding to the maximum number of stored markers.

* * * * *